(12) United States Patent
Li et al.

(10) Patent No.: US 12,128,370 B2
(45) Date of Patent: Oct. 29, 2024

(54) RAW MATERIAL MIXING APPARATUS

(71) Applicant: CHONGQING DEZHUANG AGRICULTURAL PRODUCTS DEVELOPMENT CO., LTD., Chongqing (CN)

(72) Inventors: Dejian Li, Chongqing (CN); Shubang Lu, Chongqing (CN); Li Zhang, Chongqing (CN); Decai Zhou, Chongqing (CN); Qinsong Yue, Chongqing (CN); Yangmei Li, Chongqing (CN); Yi Tang, Chongqing (CN)

(73) Assignee: CHONGQING DEZHUANG AGRICULTURAL PRODUCTS DEVELOPMENT CO., LTD., Chongqing (CN)

( * ) Notice: Subject to any disclaimer, the term of this patent is extended or adjusted under 35 U.S.C. 154(b) by 643 days.

(21) Appl. No.: 17/402,629

(22) Filed: Aug. 16, 2021

(65) Prior Publication Data
US 2021/0370246 A1 Dec. 2, 2021

Related U.S. Application Data

(63) Continuation of application No. PCT/CN2020/136164, filed on Dec. 14, 2020.

(30) Foreign Application Priority Data

Dec. 25, 2019 (CN) .......................... 201911357023.7

(51) Int. Cl.
*B01F 27/191* (2022.01)
*B01F 27/09* (2022.01)
(Continued)

(52) U.S. Cl.
CPC .......... *B01F 27/191* (2022.01); *B01F 27/092* (2022.01); *B01F 27/115* (2022.01);
(Continued)

(58) Field of Classification Search
CPC .... B01F 27/191; B01F 27/092; B01F 27/115; B01F 35/3203; B01F 35/71805;
(Continued)

(56) References Cited

U.S. PATENT DOCUMENTS 3,279,895 A * 10/1966 Howe ..................... B01F 27/05
366/328.3
4,068,832 A * 1/1978 Blaetz .................. A23G 3/0221
99/452

(Continued)

FOREIGN PATENT DOCUMENTS

CN 205182604 U 4/2016
CN 106974247 A 7/2017
(Continued)

OTHER PUBLICATIONS

International Search Report of PCT Patent Application No. PCT/CN2020/136164 issued on Mar. 10, 2021.

*Primary Examiner* — Charles Cooley

(57) ABSTRACT

A raw material mixing apparatus, including mixing drums and a feed pipe, each of the two mixing drums is provided with a feed port and a discharge port, the feed ports of the two mixing drums are both communicated with the feed pipe, and a switching valve is arranged on the feed pipe; a first rotating disc and a second rotating disc are rotatably connected at two ends of each said mixing drum respectively, and a stirring assembly is connected between the first rotating disc and the second rotating disc in the axial direction of each said mixing drum; the stirring assembly includes a central stirring element and a plurality of non-central stirring elements radially arranged between inner (Continued)

side walls of each said mixing drum and outer side walls of the central stirring element.

11 Claims, 3 Drawing Sheets

(51) Int. Cl.
  *B01F 27/115* (2022.01)
  *B01F 35/32* (2022.01)
  *B01F 35/71* (2022.01)
  *B01F 101/06* (2022.01)

(52) U.S. Cl.
  CPC .... *B01F 35/3203* (2022.01); *B01F 35/71805* (2022.01); *B01F 2101/06* (2022.01)

(58) Field of Classification Search
  CPC ...... B01F 2101/06; B01F 23/60; B01F 31/40; B01F 33/812; B01F 35/512; B01F 27/13; B01F 31/441; B01F 27/73; B01F 27/96; Y02A 40/90
  USPC ............................................ 366/288, 325.94

See application file for complete search history.

(56) References Cited

U.S. PATENT DOCUMENTS

| | | | | |
|---|---|---|---|---|
| 4,132,484 A | * | 1/1979 | Kimmel | B01F 27/951 |
| | | | | 366/288 |
| 4,148,590 A | * | 4/1979 | Sotirianos | C12M 27/02 |
| | | | | 366/288 |
| 4,176,970 A | * | 12/1979 | Blaetz | A23G 3/14 |
| | | | | 366/280 |
| 4,183,679 A | * | 1/1980 | Kimmel | B01F 27/95 |
| | | | | 366/288 |
| 4,380,398 A | * | 4/1983 | Burgess | B01F 27/95 |
| | | | | 366/261 |
| 5,028,141 A | * | 7/1991 | Stiegelmann | B01F 35/165 |
| | | | | 366/288 |
| 2021/0370246 A1 | * | 12/2021 | Li | B01F 35/3203 |

FOREIGN PATENT DOCUMENTS

| | | |
|---|---|---|
| CN | 206701276 U | 12/2017 |
| CN | 108126595 A | 6/2018 |
| CN | 207981165 U | 10/2018 |
| CN | 208800035 U | 4/2019 |
| CN | 208914335 U | 5/2019 |
| CN | 209490712 U | 10/2019 |
| CN | 209646293 U | 11/2019 |
| CN | 209680039 U | 11/2019 |
| CN | 209680060 U | 11/2019 |
| CN | 111013461 A | 4/2020 |
| JP | H03288556 A | 12/1991 |
| KR | 20140061291 A | 5/2014 |

* cited by examiner

RAW MATERIAL MIXING APPARATUS

CROSS-REFERENCE TO RELATED APPLICATION

The present application is a continuation of international application of PCT application No. PCT/CN2020/136164 filed on Dec. 14, 2020, which claims the priority benefit of China application No. 201911357023.7 filed on Dec. 25, 2019. The entirety of the above-mentioned patent applications is incorporated herein by reference and made a part of this specification.

BACKGROUND

Technical Field

The application relates to the field of powder material mixing equipment, and in particular, to a raw material mixing apparatus.

Description of Related Art

Instant (Ready-to-eat) pepper powder is very popular among the common people. Catering services, such as Hot pot, Bo Bo Chicken and spicy hot pot skewers usually provide customers with instant seasonings such as "dry dish of pepper powder".

The instant pepper powder is produced by mixing pepper powder with various ingredients, and a mixer for mixing materials is generally classified into a vertical mixer and a horizontal mixer. In terms of the horizontal mixer, the mixing mode is divided into rotary mixing and non-rotary mixing. In particular, a non-rotary mixer usually has a stationary container and a stirring device arranged inside, with materials in the container being stirred and mixed under the action of the stirring device. However, the materials are easily aggregated in the container and are not easy to fully disperse in the container, the stirring is insufficient, and the uniformity is low.

SUMMARY

It is an object of the present application to provide a continuous raw material mixing apparatus, so as to reduce an insufficient stirring problem caused by aggregation of the powder material during stirring.

To achieve the above object, the present application adopts the following technical solutions:

a raw material mixing apparatus, including two horizontally-arranged cylindrical mixing drums and a feed pipe for feeding raw materials to each said mixing drum, each of the two mixing drums is provided with a feed port and a discharge port, the feed ports of the two mixing drums are both communicated with the feed pipe, and a switching valve is arranged on the feed pipe; a first rotating disc and a second rotating disc are rotatably connected at two ends of each said mixing drum respectively, and a stirring assembly is connected between the first rotating disc and the second rotating disc in the axial direction of each said mixing drum; the stirring assembly includes a central stirring element and a plurality of non-central stirring elements radially arranged between inner side walls of each said mixing drum and outer side walls of the central stirring element, the outer side walls of the non-central stirring elements are all arranged closely adjacent to the inner side walls of each said mixing drum, each of the non-central stirring elements has a spreading bar arranged inside, and the central stirring element and the non-central stirring element are both movable in the axial direction of the first rotating disc and the second rotating disc, and the axial movements of the central stirring element and the non-central stirring element are in opposite directions.

The principle of this solution is as follows.

Traditional mixing is usually performed by one mixing apparatus. During the mixing process, the feeding device is in a shutdown state, and after the mixing apparatus completes mixing and discharges materials, the feeding device continuously feeds the materials to the mixing apparatus, so that the mixing process is discontinuous, and the operation of mixing is stopped during the feeding and discharging processes. According to the present application, the two mixing drums are arranged for mixing the powders, and the purpose is that, the feed pipe can continuously feed materials, and when the feed pipe is fed to one of the mixing drums, the other mixing drum is mixed, so that the mixing drum is always in operation, and thus the continuous operation of the mixing process is ensured. Moreover, two mixing drums are arranged, and when one mixing drum breaks down or is damaged, the other mixing drum can work, thereby avoiding the defect that the mixing drum has to be shut down for maintenance and work again after maintenance is complete, when there is only one mixing drum and the mixing drum breaks down.

The specific principle of mixing the materials by each said mixing drum is as follows: each said mixing drum does not move, and the raw materials such as pepper powder and ingredients in each said mixing drum are stirred and mixed uniformly through stirring of the stirring assembly in each said mixing drum. According to the present application, the stirring assembly is arranged to be a structure including the central stirring element and the plurality of non-central stirring elements radially arranged between inner side walls of each said mixing drum and outer side walls of the central stirring element, the central stirring element and the non-central stirring elements are driven to rotate through the rotation of the first rotating disc and the second rotating disc, so that the powder in each said mixing drum is fully and uniformly stirred. Since the stirring mode of the present application is that each said mixing drum is immobile and the stirring assembly is stirred to realize the mixing of the powder. Therefore, the powder is easy to aggregate in a pile in each said mixing drum and is not easy to disperse along the axial direction of each said mixing drum, and during actual stirring, in general, more powder is aggregated in the middle of each said mixing drum while less powder is aggregated at two ends of each said mixing drum. The present application is configured such that the central stirring element and the non-central stirring element are both movable in the axial direction of the first rotating disc and the second rotating disc, and the axial movements of the central stirring element and the non-central stirring element are in opposite directions. In this way, during the axial movement of the central stirring element and the non-central stirring element, the powder aggregated in a pile can be axially spread out through the spreading bar, and the insufficient stirring problem caused by aggregation of the powder material during stirring can be reduced.

With this solution, the following technical effects can be achieved.

1. Two mixing drums are adopted to mix the raw materials, so that a continuous mixing process can be realized;
2. By providing the central stirring element and the non-central stirring element in each said mixing drum, and the axially movements in the opposite directions of the two, the problem of insufficient stirring caused by the aggregation of the powder during stirring is reduced, and therefore the stirring mixing is more sufficient, and the mixing uniformity is improved.

Further, each of the central stirring element and the non-central stirring element includes a plurality of rectangular frames, a central axis of the central stirring element coincides with an axis of each said mixing drum, and a central axis of the non-central stirring element is parallel to the axis of each said mixing drum; both ends of the central stirring element are fixed with a central support shaft, both ends of the non-central stirring element are fixed with a non-central support shaft, through holes are formed in a one-to-one correspondence with the central support shaft and the non-central support shaft in the first rotating disc and the second rotating disc, and the non-central support shaft and the central support shaft are respectively slidably connected in the corresponding through holes.

The central stirring element and the non-central stirring element are all configured to be a structure of a plurality of rectangular frames, therefore, a large stirring space can be formed during stirring, powder in each said mixing drum is completely covered, and therefore stirring is more sufficient. The central stirring element and the non-central stirring element are mounted on the first rotating disc and the second rotating disc in a manner that the non-central support shaft and the central support shaft are matched with the through holes, therefore, the axial movement of the central stirring element and the non-central stirring element is facilitated, and the central stirring element and the non-central stirring elements are driven to rotate through the rotation of the first rotating disc and the second rotating disc, so as to perform stirring.

Further, a sliding disc is arranged between the second rotating disc and an end of each said mixing drum, the circumferential side wall of the sliding disc is attached to the inner side wall of each said mixing drum, one end of the non-central support shaft is fixed to the sliding disc, a first driving cavity is formed between the sliding disc and the second rotating disc, a second driving cavity is formed between the sliding disc and the end of each said mixing drum, and the first driving cavity is communicated with a bidirectional exhaust fan; a central hole is formed in the middle of the sliding disc, a piston cylinder is slidably connected in the central hole, one end of the piston cylinder is rotatably connected to an end in each said mixing drum, and the other end is fixed to the second rotating disc, a piston is slidably connected in the piston cylinder, and the piston is fixedly connected to one end of the central support shaft.

The structure of the sliding disc is arranged, so that the sliding disc slides in each said mixing drum to drive all the non-central stirring elements to move axially. The bidirectional exhaust fan pumps gas into or out of the first driving cavity to achieve sliding of the sliding disc in each said mixing drum so that movement of the piston is achieved, the piston in turn drives the central stirring element to move. In other words, gas, serving as power, can simultaneously drive the central stirring element and the non-central stirring element to move axially.

Further, a plurality of drum unidirectional intake valves are arranged on the second rotating disc.

The gas in the first driving cavity enters each said mixing drum through the drum unidirectional intake valve, and on the one hand, the powder material is dispersed to prevent the insufficient stirring problem caused by aggregation of the powder material during stirring, and on the other hand, the powder material in the drum is good in fluidity, smoother in stirring and more uniform in mixing.

Further, the spreading bar is provided in two sets, two sets of spreading bars are arranged symmetrically about a perpendicular bisector of the non-central stirring element, and the two sets of spreading bars are respectively obliquely arranged, with one end pointing to a corresponding end of each said mixing drum.

During the mixing process, the powder in each said mixing drum is usually aggregated in the middle of each said mixing drum, the oblique spreading bars are arranged, so that powder in the middle of each said mixing drum can be dispersed to both ends.

Further, a mounting hole is formed in an end face of each said mixing drum, a rotating shaft is fixed to the first rotating disc and penetrates through the mounting hole, a motor is arranged on an outer end face of each said mixing drum, and the motor is connected to the rotating shaft through a belt.

The motor drives the rotating shaft to rotate through the belt, and therefore the first rotating disc fixed with the rotating shaft is driven to rotate.

Further, outer edges of the first rotating disc and the second rotating disc are provided with sealing rings.

The powder moves in the space between the first rotating disc and the second rotating disc, and the sealing ring can realize the sealing between the first rotating disc and the inner side wall of each said mixing drum as well as the second rotating disc and the inner side wall of each said mixing drum, thereby preventing the powder from leaking.

Further, the switching valve is a three-way switching valve.

The three-way switching valve is suitable for a structure with one end for feeding and two ends for discharging.

Further, the inner side wall of each said mixing drum is provided with an anti-adhesive coating.

The anti-adhesive coating can reduce the adhesion of the powder on the inner side wall of each said mixing drum.

Further, the raw material comprises pepper powder and ingredients, and the ingredients comprise dried Chinese prickly ash powder, spices, edible salt, white sugar, monosodium glutamate and chicken essence seasoning.

The instant pepper powder prepared by mixing the above ingredients has good taste.

DESCRIPTION OF THE EMBODIMENTS

Figure 1:
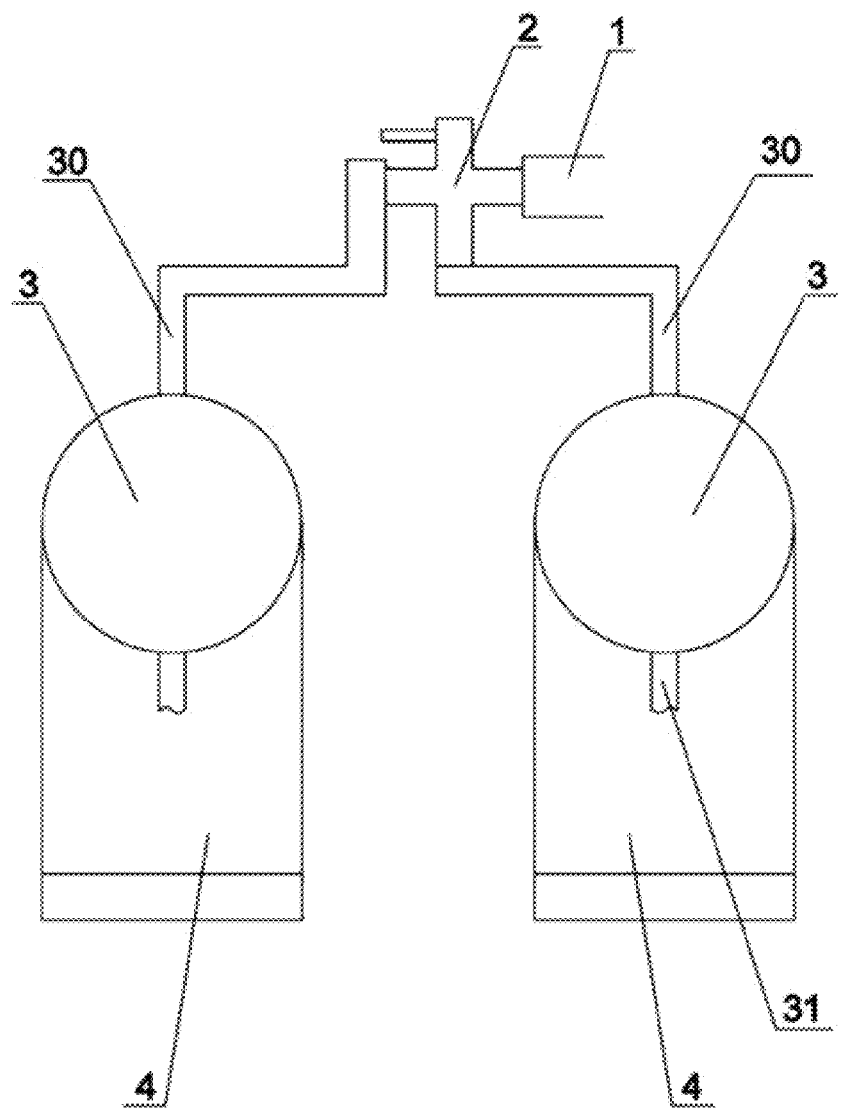
FIG. 1 is a side view of Embodiment 1 of the present application.

Hereinafter, the present application is further illustrated in detail in combination with the specific embodiments.

Reference numerals in the drawings: 1—feed pipe; 2—three-way switching valve; 3—mixing drum; 30—feed port; 31—discharge port; 4—support frame; 5—non-central stirring element; 50—non-central support shaft; 500—spreading bar; 6—central stirring element; 60—central support shaft; 7—second rotating disc; 70—drum unidirectional intake valve; 8—piston cylinder; 81—piston; 82—piston; 9—rotating block; 10—first rotating disc; 11—through hole; 12—bidirectional exhaust fan; 13—sliding disc; 14—second driving cavity; 15—first driving cavity.

Embodiment 1

Figure 2:
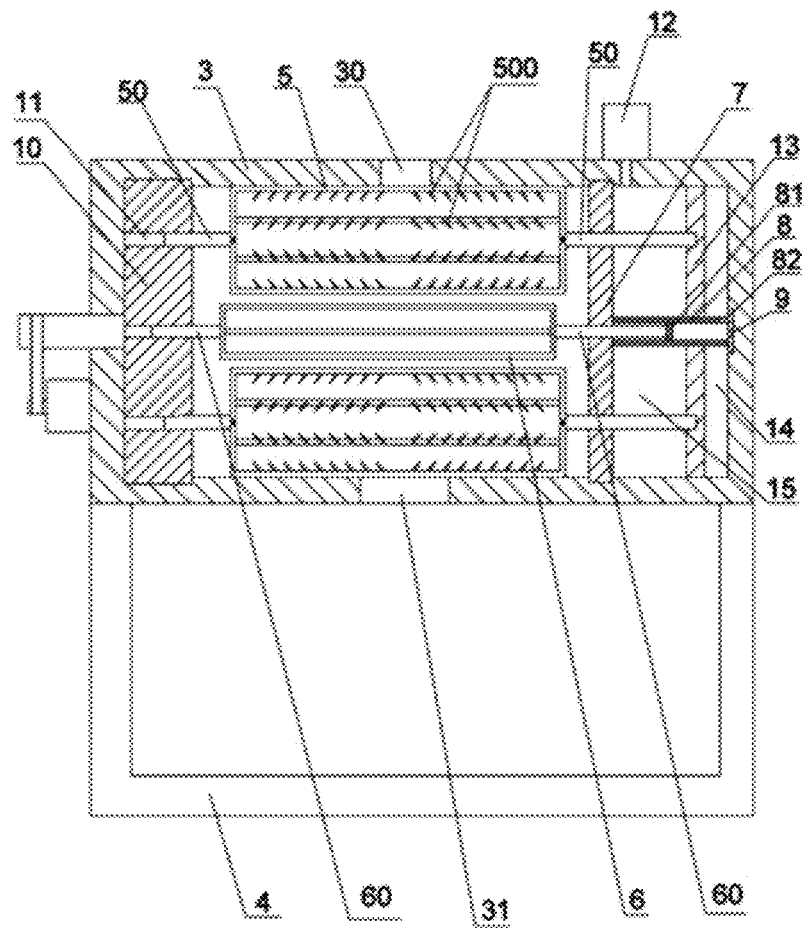
FIG. 2 is a front cross-sectional view of a mixing drum in FIG. 1.

As shown in FIG. 1, a continuous raw material mixing apparatus in this embodiment includes a feed pipe 1 and two mixing drums 3. Each of the mixing drum 3 is supported by a support frame 4. The feed pipe 1 is used for feeding raw materials such as pepper powder and ingredients, and the ingredients include dried Chinese prickly ash powder, spices, edible salt, white sugar, monosodium glutamate and chicken essence seasoning. The inner side wall of each of the mixing drum 3 is provided with an anti-adhesive coating, and as shown in FIG. 2, each of the two mixing drums 3 is provided with a feed port 30 and a discharge port 31, the feed port 30 is disposed at a top of each of the mixing drum 3, and the discharge port 31 is disposed at a bottom of each of the mixing drum 3. The feed ports 30 of the two mixing drums 3 are both in communication with the feed pipe 1 through a three-way switching valve 2, and through the switching of the three-way switching valve 2, the feed pipe 1 can only be in communication with one of the mixing drums 3.

The internal structure of each of the mixing drum 3 is shown in FIG. 2, two ends of each of the mixing drum 3 are respectively rotatably connected to the first rotating disc 10 and the second rotating disc 7, and sealing rings are provided at the outer edges of the first rotating disc 10 and the second rotating disc 7. A mounting hole is formed in an end face of each of the mixing drum 3, a rotating shaft is fixed to the first rotating disc 10 and penetrates through the mounting hole, a motor is arranged on an outer end face of each of the mixing drum 3, and the motor is connected to the rotating shaft through a belt. The motor drives the rotating shaft to rotate via the belt, and therefore the first rotating disc 10 fixed with the rotating shaft is driven to rotate.

A stirring assembly is connected between the first rotating disc 10 and the second rotating disc 7 in an axial direction of each of the mixing drum 3. The stirring assembly includes a central stirring element 6 and a plurality of non-central stirring elements 5 radially arranged between inner side walls of each of the mixing drum 3 and outer side walls of the central stirring element 6, and the outer side walls of the non-central stirring elements 5 are all arranged closely adjacent to the inner side walls of each of the mixing drum 3. Each of the central stirring element 6 and the non-central stirring element 5 includes a plurality of rectangular frames, a central axis of the plurality of rectangular frames of the central stirring element 6 coincides with an axis of each of the mixing drum 3, and a central axis of the non-central stirring element 5 is parallel to the axis of each of the mixing drum 3. Both ends of the central stirring element 6 are fixed with a central support shaft 60, both ends of the non-central stirring element 5 are fixed with a non-central support shaft 50. Through holes 11 (the through holes 11 are square holes) are formed in one-to-one correspondence with the central support shaft 60 and the non-central support shaft 50 in the first rotating disc 10 and the second rotating disc 7, and the non-central support shaft 50 and the central support shaft 60 are respectively slidably connected in corresponding through holes 11.

As shown in FIG. 2, a sliding disc 13 is arranged between the second rotating disc 7 and the right end of each of the mixing drum 3, the circumferential side wall of the sliding disc 3 is attached to the inner side wall of each of the mixing drum 3, the right end of the non-central support shaft 50 is fixed to the sliding disc 13, a first driving cavity 15 is formed between the sliding disc 13 and the second rotating disc 7, a second driving cavity 14 is formed between the sliding disc 13 and the end of each of the mixing drum 3, and the first driving cavity 15 is in communication with a bidirectional exhaust fan 12. A central hole is formed in the middle of the sliding disc 13, a piston cylinder 8 is slidably connected in the central hole, one end of the piston cylinder 8 is rotatably connected to the right end in each of the mixing drum 3 through a rotating block 9, and the other end is fixed to the second rotating disc 7. A piston 81 is slidably connected in the piston cylinder 8, and the piston 81 is fixedly connected to one end of the central support shaft 60. An air inlet 82 is formed in a wall of the cavity, away from the piston, of the piston cylinder 8, and the air inlet 82 is disposed within the second driving cavity 14.

Each of the non-central stirring elements 5 has a spreading bar 500 arranged on its inside, there are two sets of spreading bars 500, two sets of spreading bars 500 are arranged symmetrically about a perpendicular bisector of the non-central stirring element 5, and the two sets of spreading bars 500 are respectively obliquely arranged, with one end pointing to a corresponding end of each of the mixing drum3.

The traditional mixing process is usually performed by one mixing apparatus, during which the feeding device is in a shutdown state, and after the mixing apparatus completes mixing and discharges materials, the feeding device continuously feeds the materials to the mixing apparatus, so that the mixing process is discontinuous, and the mixing work is stopped during the feeding and discharging processes. According to the present application, the two mixing drums 3 are arranged for mixing the powders, and the purpose is that the feed pipe 1 can continuously feed materials, and when the feed pipe 1 is fed to one of the mixing drums 3, the other mixing drum 3 is mixed, so that the mixing drum 3 is always in work, and thus the continuous operation of the mixing process is ensured. Moreover, two mixing drums 3 are arranged, and when one mixing drum 3 breaks down or is damaged, the other mixing drum 3 can work, thereby avoiding the defect that the mixing drum 3 has to be shut down for maintenance and work again after maintenance is complete, when there is only one mixing drum 3 and the mixing drum 3 breaks down.

The specific principle of mixing the materials by each of the mixing drum 3 is as follows: each of the mixing drum 3 does not move, and the raw materials such as pepper powder and ingredients in each of the mixing drum 3 are stirred and mixed uniformly through stirring of the stirring assembly in each of the mixing drum 3. According to the present application, the stirring assembly is arranged to be a structure including the central stirring element 6 and the plurality of non-central stirring elements 5 radially arranged between inner side walls of each of the mixing drum 3 and outer side walls of the central stirring element 6, the motor drives the first rotating disc 10 to rotate, and thus drives the central stirring element 6 and the non-central stirring elements 5 to rotate, and therefore, the powder in each of the mixing drum 3 is fully and uniformly stirred. Specifically, the first rotating disc and the second rotating disc are rotatably connected at two ends of each of the mixing drum, when the materials are mixed by each of the mixing drum, each of the mixing drum does not move and the first rotating disc and the second rotating disc rotate, thereby driving the central stirring element 6 and non-central stirring elements 5 to rotate around the axis defined by the reference character 60. During a rotation of the central stirring element 6 and non-central stirring elements 5, they will encounter resistance from the materials to be mixed. At this time, the rectangular frames of the central stirring element 6 and non-central stirring elements 5 will rotate. At this time, the rectangular frame of the central stirring element 6 rotates around the axis defined by the reference character 60, while the rectangular frames of each of the non-central stirring elements 5 rotate around the axis defined by the reference character 50. That is to say, the non-central stirring elements 5 can rotate around the axis defined by reference character 60 and further can rotate around their own axes defined by reference character 50 thereby undergoing planetary motion. According to the present application, the central stirring element 6 and the non-central stirring element 5 are all configured to be a structure of a plurality of rectangular frames, a large stirring space can be formed during stirring, powder in each of the mixing drum 3 is completely covered, and therefore stirring is more sufficient.

As shown FIG. 2, since the stirring mode of the present application is that each of the mixing drum 3 is immobile and the stirring assembly is stirred to realize the mixing of the powder. Therefore, the powder is easy to aggregate in a pile in each of the mixing drum 3 and is not easy to disperse along the axial direction of each of the mixing drum 3, and during actual stirring, in general, more powder is aggregated in the middle of each of the mixing drum 3 while less powder is aggregated at two ends of each of the mixing drum 3. In the stirring process, the bidirectional exhaust fan 12 introduces gas into and sucks gas out of the first driving cavity 15. When the bidirectional exhaust fan 12 introduces gas into the first driving cavity 15, the sliding disc 13 is driven to move rightwards, the sliding disc 13 drives all the non-central stirring elements 5 to move rightwards, and meanwhile, during the movements to the right, since the sliding disc 13 also presses the gas in the second driving cavity 14 into the piston cylinder 8, so that the piston 81 moves leftwards, and the piston 81 in turn drives the central stirring element 6 to move leftwards. Likewise, when the bidirectional exhaust fan 12 sucks gas out of the first driving cavity 15, the non-central stirring element 5 is driven to move leftwards, and the central stirring element 6 is driven to move rightwards. In the axial movement process of the central stirring element 6 and the non-central stirring element 5, powder aggregated in a pile can be axially spread through the spreading bar 500, the problem of insufficient stirring caused by the aggregation of the powder during stirring is reduced, and therefore the stirring mixing is more sufficient, and the mixing uniformity is improved.

Embodiment 2

Figure 3:
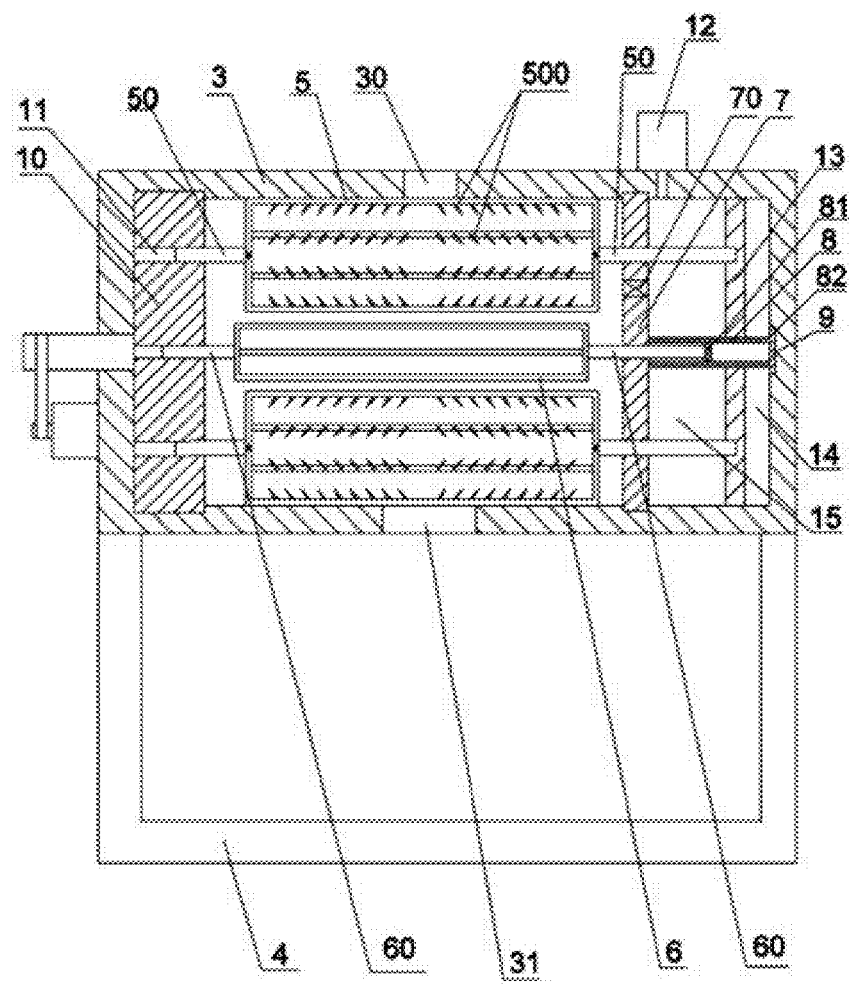
FIG. 3 is a front cross-sectional view of a mixing drum in Embodiment 1 of the present application.

This embodiment differs from Embodiment 1 in that: as shown in FIG. 3, a plurality of drum unidirectional intake valves 70 are arranged on the second rotating disc 7, and the number of the drum unidirectional intake valves 70 in this embodiment is selected to be one.

When the bidirectional exhaust fan 12 introduces gas into the first driving cavity 15, the gas in the first driving cavity 15 can enter each of the mixing drum 3 through the drum unidirectional intake valve 70, and on the one hand, the powder material is dispersed to prevent the insufficient stirring problem caused by aggregation of the powder material during stirring, and on the other hand, the powder material in the drum is good in fluidity, smoother in stirring and more uniform in mixing.

Embodiment 3

This embodiment differs from Embodiment 1 in that: the spreading bars 500 are not obliquely arranged but are perpendicular to the rectangular frame in the non-central stirring element 5, and powder aggregated in each of the mixing drum 3 can be spread by adopting such a spreading bar.

These embodiments are merely explanatory of the application, and common knowledge such as the specific structure and characteristics in the technical solution is not described herein. It should be noted that, for a person skilled in the art, several variations and modifications can be made without departing from the structure of the present application, and these should also be regarded as the protection scope of the present application, which will not affect the effects and patentability of the present application. The protection scope of the present application is defined by the appended claims, and the description such as the specific embodiments in the specification can be used to interpret the content of the claims.

What is claimed is:

1. A raw material mixing apparatus, comprising two horizontally-arranged cylindrical mixing drums and a feed pipe for feeding raw materials to each said mixing drum, wherein each of the two mixing drums is provided with a feed port and a discharge port, the feed ports of the two mixing drums are both communicated with the feed pipe, and a switching valve is arranged on the feed pipe; a first rotating disc and a second rotating disc are rotatably connected at two ends of each said mixing drum respectively, and a stirring assembly is connected between the first rotating disc and the second rotating disc in the axial direction of each said mixing drum; the stirring assembly comprises a central stirring element and a plurality of non-central stirring elements radially arranged between inner side walls of each said mixing drum and outer side walls of the central stirring element, the outer side walls of the non-central stirring elements are all arranged closely adjacent to the inner side walls of each said mixing drum, each of the non-central stirring elements has a spreading bar arranged inside, and the central stirring element and the non-central stirring element are both movable in the axial direction of the first rotating disc and the second rotating disc, and the axial movements of the central stirring element and the non-central stirring element are in opposite directions.

2. The raw material mixing apparatus according to claim 1, wherein each of the central stirring element and the non-central stirring element comprises a plurality of rectangular frames, a central axis of the plurality of rectangular frames of the central stirring element coincides with an axis of each said mixing drum, and a central axis of the non-central stirring element is parallel to the axis of each said mixing drum; both ends of the central stirring element are fixed with a central support shaft, both ends of the non-central stirring element are fixed with a non-central support shaft, through holes are formed in a one-to-one correspondence with the central support shaft and the non-central support shaft in the first rotating disc and the second rotating disc, and the non-central support shaft and the central support shaft are respectively slidably connected in the corresponding through holes.

3. The raw material mixing apparatus according to claim 2, wherein a sliding disc is arranged between the second rotating disc and an end of each said mixing drum, the circumferential side wall of the sliding disc is attached to the inner side wall of each said mixing drum, one end of the non-central support shaft is fixed to the sliding disc, a first driving cavity is formed between the sliding disc and the second rotating disc, a second driving cavity is formed between the sliding disc and the end of each said mixing drum, and the first driving cavity is communicated with a bidirectional exhaust fan; a central hole is formed in the middle of the sliding disc, a piston cylinder is slidably connected in the central hole, one end of the piston cylinder is rotatably connected to an end in each said mixing drum, and the other end is fixed to the second rotating disc, a piston is slidably connected in the piston cylinder, and the piston is fixedly connected to one end of the central support shaft.

4. The raw material mixing apparatus according to claim 3, wherein a plurality of drum unidirectional intake valves are arranged on the second rotating disc.

5. The raw material mixing apparatus according to claim 4, wherein the spreading bar is provided in two sets, two sets of spreading bars are arranged symmetrically about a perpendicular bisector of the non-central stirring element, and the two sets of spreading bars are respectively obliquely arranged, with one end pointing to a corresponding end of each said mixing drum.

6. The raw material mixing apparatus according to claim 5, wherein a mounting hole is formed in an end face of each said mixing drum, a rotating shaft is fixed to the first rotating disc and penetrates through the mounting hole, a motor is arranged on an outer end face of each said mixing drum, and the motor is connected to the rotating shaft through a belt.

7. The raw material mixing apparatus according to claim 1, wherein outer edges of the first rotating disc and the second rotating disc are provided with sealing rings.

8. The raw material mixing apparatus according to claim 7, wherein the switching valve is a three-way switching valve.

9. The raw material mixing apparatus according to claim 1, wherein the switching valve is a three-way switching valve.

10. The raw material mixing apparatus according claim 1, wherein the inner side wall of each said mixing drum is provided with an anti-adhesive coating.

11. The raw material mixing apparatus according to claim 1, wherein the raw material comprises pepper powder and ingredients, and the ingredients comprise dried Chinese prickly ash powder, spices, edible salt, white sugar, monosodium glutamate and chicken essence seasoning.

* * * * *